United States Patent
Suma

(10) Patent No.: US 8,210,792 B2
(45) Date of Patent: Jul. 3, 2012

(54) WIND ENERGY SYSTEM

(75) Inventor: Alexander B. Suma, Miami, FL (US)

(73) Assignee: University of Miami, Miami, FL (US)

( * ) Notice: Subject to any disclaimer, the term of this patent is extended or adjusted under 35 U.S.C. 154(b) by 0 days.

(21) Appl. No.: 12/797,976

(22) Filed: Jun. 10, 2010

(65) Prior Publication Data

US 2010/0247302 A1   Sep. 30, 2010

Related U.S. Application Data

(60) Provisional application No. 61/218,713, filed on Jun. 19, 2009.

(51) Int. Cl.
*F03D 3/04* (2006.01)
*F03D 11/04* (2006.01)

(52) U.S. Cl. ............................ 415/4.2; 415/126; 415/191

(58) Field of Classification Search ................... 415/4.2, 415/72, 126, 147, 191, 208.2; 416/176; 290/44, 290/55

See application file for complete search history.

(56) References Cited

U.S. PATENT DOCUMENTS

| | | | |
|---|---|---|---|
| 3,302,552 A | 2/1967 | Walsh | |
| 3,994,621 A | 11/1976 | Bogie | |
| 4,017,205 A * | 4/1977 | Bolie | 415/208.2 |
| 4,057,270 A | 11/1977 | Lebost | |
| 4,237,384 A | 12/1980 | Kennon | |
| 4,269,563 A | 5/1981 | Sharak et al. | |
| 4,396,843 A | 8/1983 | Martinez Parra | |
| 4,415,814 A | 11/1983 | Martinez | |
| 4,433,544 A | 2/1984 | Wells et al. | |
| 4,945,693 A | 8/1990 | Cooley | |
| 5,381,048 A | 1/1995 | Baird | |
| 5,394,016 A | 2/1995 | Hickey | |
| 5,447,412 A | 9/1995 | Lamont | |
| 5,852,331 A | 12/1998 | Giorgini | |
| 6,147,415 A | 11/2000 | Fukada | |
| 6,582,291 B2 * | 6/2003 | Clark | 454/19 |
| 6,674,181 B2 | 1/2004 | Harbison | |
| 6,765,309 B2 | 7/2004 | Tallal, Jr. et al. | |
| 6,841,894 B2 | 1/2005 | Gomez Gomar | |
| 6,870,280 B2 | 3/2005 | Pechler | |
| 6,877,948 B2 * | 4/2005 | Cutcher | 415/4.4 |
| 6,911,744 B2 | 6/2005 | Roskey | |
| 6,984,899 B1 * | 1/2006 | Rice | 290/44 |

(Continued)

FOREIGN PATENT DOCUMENTS

DE   19828324 A1 * 12/1999

(Continued)

OTHER PUBLICATIONS

Translation of DE 198 28 324 A1 claims.*

(Continued)

*Primary Examiner* — Edward Look
*Assistant Examiner* — Sean J Younger
(74) *Attorney, Agent, or Firm* — Christopher & Weisberg, P.A.

(57) ABSTRACT

A method and system for harvesting wind energy. The system may include a wind turbine disposed subjcent to a roof assembly of building. A plurality of conduits are adjacent to and extending below the wind turbine, wherein each of the plurality of conduits defines a first portion and a second portion, wherein the first portion defines a larger cross-sectional area than the second portion.

20 Claims, 11 Drawing Sheets

U.S. PATENT DOCUMENTS

| | | | |
|---|---|---|---|
| D516,581 S | 3/2006 | Gomez Gomar | |
| 7,315,093 B2* | 1/2008 | Graham, Sr. | 290/55 |
| 2002/0006334 A1 | 1/2002 | Szpur | |
| 2004/0130161 A1 | 7/2004 | Gomez Gomar | |
| 2006/0275105 A1 | 12/2006 | Roberts et al. | |
| 2007/0217918 A1 | 9/2007 | Baker et al. | |
| 2007/0222225 A1 | 9/2007 | Mahoney | |
| 2007/0274830 A1 | 11/2007 | Flores Lumbreras | |
| 2009/0095339 A1* | 4/2009 | Nightingale | 136/244 |

FOREIGN PATENT DOCUMENTS

| | | |
|---|---|---|
| EP | 0867615 A1 | 9/1998 |
| EP | 1985847 A1 | 10/2008 |
| GB | 2269859 A * | 2/1994 |
| JP | 2003035252 A | 2/2003 |
| JP | 2007303459 A | 11/2007 |
| WO | 9904163 A1 | 1/1999 |

OTHER PUBLICATIONS

LaBarre, Suzanne, "Harvesting The Wind," Metropolis Magazine, May 2009.

International Search Report and Written Opinion dated Jan. 20, 2011 for the International Application No. PCT/US2010/038164, International Filing Date Jun. 10, 2010 (consisting of 3 pages).

* cited by examiner

WIND ENERGY SYSTEM

CROSS-REFERENCE TO RELATED APPLICATION

This application claims the benefit of U.S. Provisional App. Ser. No. 61/218,713 entitled WIND ENERGY SYSTEM filed Jun. 19, 2009, the entirety of which is incorporated by reference herein.

STATEMENT REGARDING FEDERALLY SPONSORED RESEARCH OR DEVELOPMENT n/a

FIELD OF THE INVENTION

The present invention relates to a system and method for harvesting wind energy.

BACKGROUND OF THE INVENTION

The desire to capture the wind to provide power is ancient; however, the methods and apparatus to perform the capture have evolved only modestly over many centuries. Recently, an increase in demand for alternative energy has enhanced interest in wind power. In large part, the latest developments have been directed to very large windmills in farm-like arrays covering vast areas of land. Often, these arrays are located far from where the generated electricity is desired and long-distance transmission lines are required. The expense and complexity of long distance transmission could be minimized if at least some of the power were to be used where it is generated and in some instances individuals have attempted to use scaled-down versions of the giant windmills in urban and suburban settings.

Conventional windmills require two or three very long blades that must be placed very high into the air so as to be positioned in a relatively smoothly flowing air current and they must also be mounted high enough so that the whirling blades do not strike the ground, trees, buildings, wires, and the like. Due to the great length of the blades and height of the mounting structures, the mounting towers can be enormous and require stabilizing guy wires anchored hundreds of feet from the mounting tower. In truth, a large windmill can be physically and visually overpowering up-close, such as in a backyard. Further, the spinning blades can create unpleasant and disruptive noise and vibration.

Not surprisingly, despite any power generation benefits, attempts to install conventional windmills (FIG. 1) typically face fierce resistance by neighbors and government officials who not unreasonably cite aesthetic and noise considerations as the basis for barring installation of the windmills. However, for the reasons identified above, even if not opposed, it is difficult if not completely impractical to use known windmills in urban or suburban settings. Yet another problem that confronts known windmills is that they are exposed to the destructive power of nature, such as storms, that can easily damage the windmill's components.

Presently, no known wind powered systems exist that provide usable electrical output with ordinary and variable wind flow arriving from any compass direction, while being visually pleasing or unnoticeable, substantially inaudible and vibration free, as well as protected from the elements.

SUMMARY OF THE INVENTION

The present invention advantageously provides a method and system for harvesting wind energy from ordinary wind flow arriving from any compass direction, while being visually pleasing or unnoticeable, inaudible, and protected from the elements.

The system may include a wind turbine disposed subjacent to a roof assembly of building. One or more conduits adjacent to and extending below the wind turbine, wherein each of the conduits defines a first portion and a second portion, wherein the first portion defines a larger cross-sectional area than the second portion.

In an alternative embodiment, the system may include a vertical axis wind turbine disposed subjacent to a roof assembly of building. One or more curved conduits may also be included, the conduits being radially disposed about the vertical axis wind turbine. Each of the conduits may define a first portion and a second portion, wherein the first portion defines a larger cross-sectional area than the second portion. The second portion may be proximate the wind turbine and the first portion may be distal the wind turbine. One or more controllable apertures may further be included, the controllable apertures being disposed about the roof assembly, the controllable apertures operable to control fluid flow into the first portion of each conduit.

In yet another embodiment, the system may include a vertical axis wind turbine disposed subjacent to a domed roof assembly of building. The vertical axis wind turbine may be in electrical communication with a power supply to the building. The dome may define a hollow interior portion and lend structural support to the building. One or more substantially curved conduits may also be included, the conduits being radially disposed at an incline about and extending below the vertical axis wind turbine. Each of the substantially curved conduits may define a first portion and a second portion, wherein the first portion defines a larger cross-sectional area than the second portion. The second portion may be proximate the vertical axis wind turbine and the first portion may be distal the vertical axis wind turbine. One or more controllable apertures may also being included, the controllable apertures spanning a lower portion of the domed roof assembly. One or more photovoltaic cells may also be included coupled to the controllable apertures. A control system may also be included, the control system may be in communication with the controllable apertures and operable to adjust the controllable apertures in response to environmental conditions.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
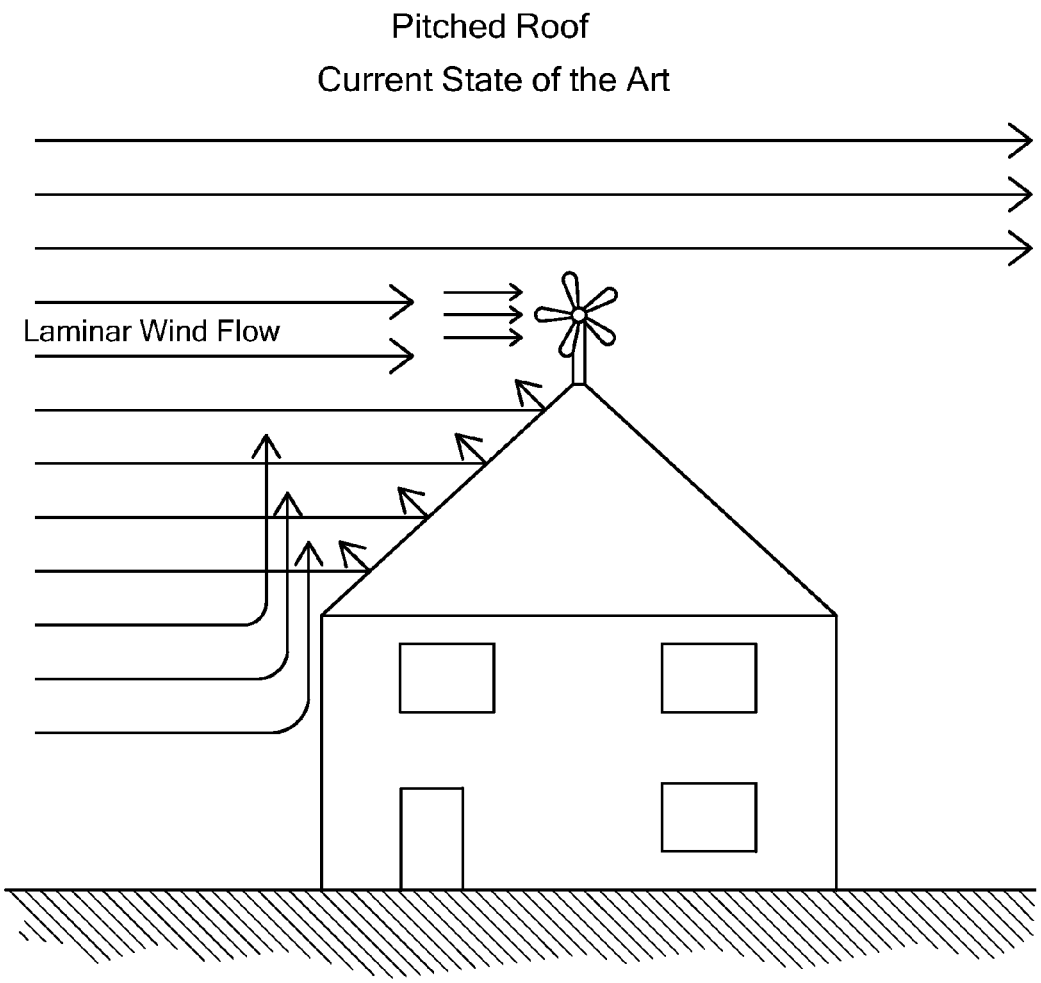
FIG. 1 is a conventional windmill installed on the surface of a roof.
Figure 2:
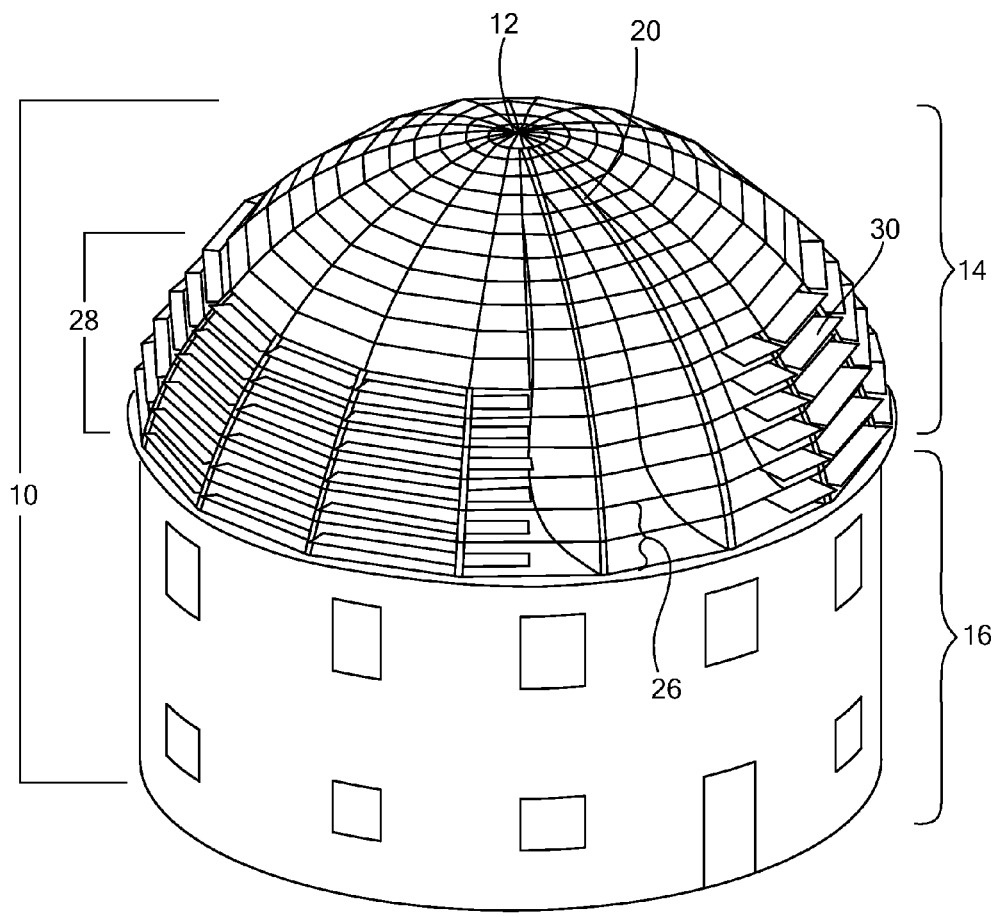
FIG. 2 is a perspective view of the wind harvesting system in accordance with the principals of the present invention.
Figure 3:
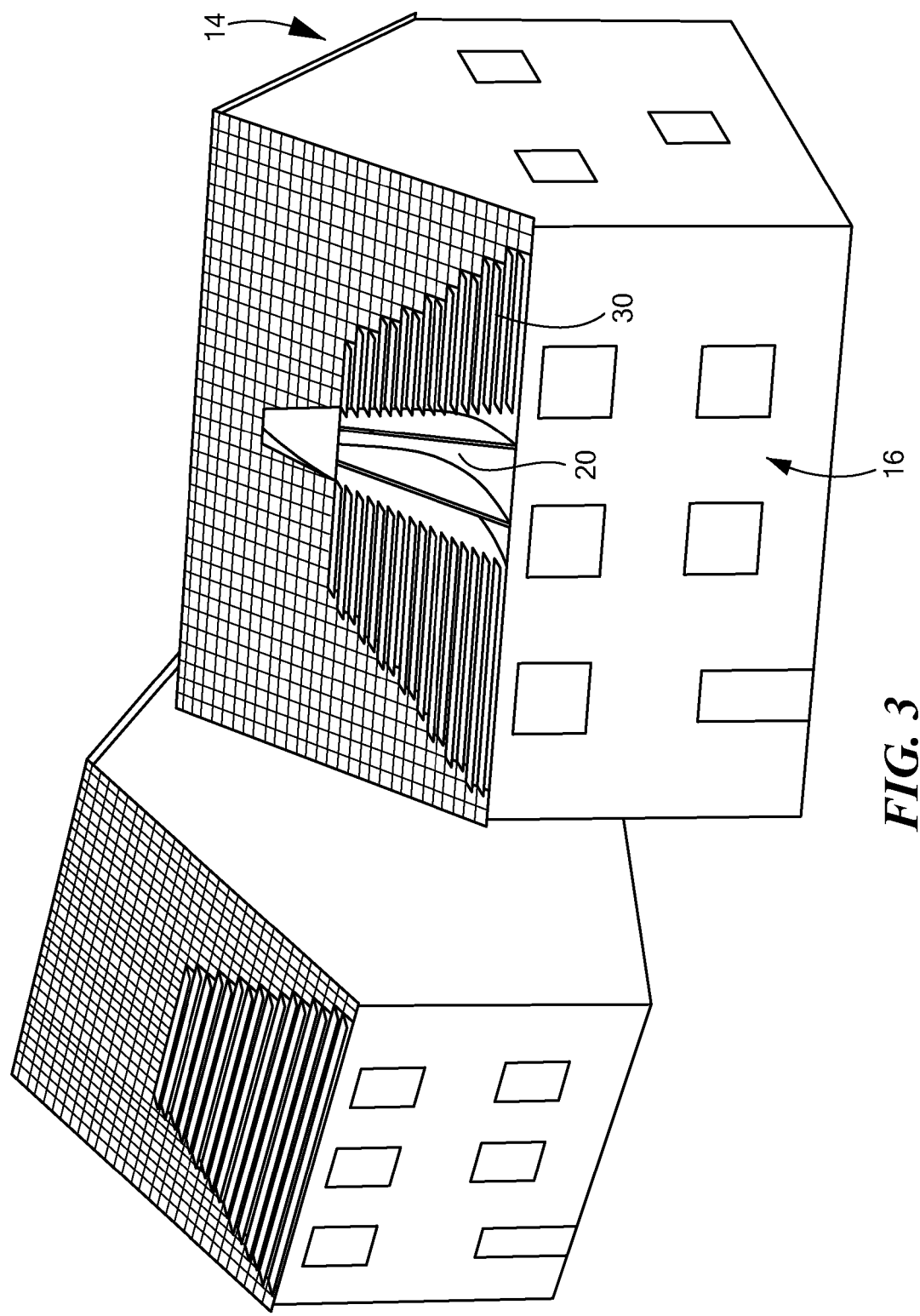
FIG. 3 is another perspective view of the wind harvesting system in accordance with the principals of the present invention.
Figure 4:
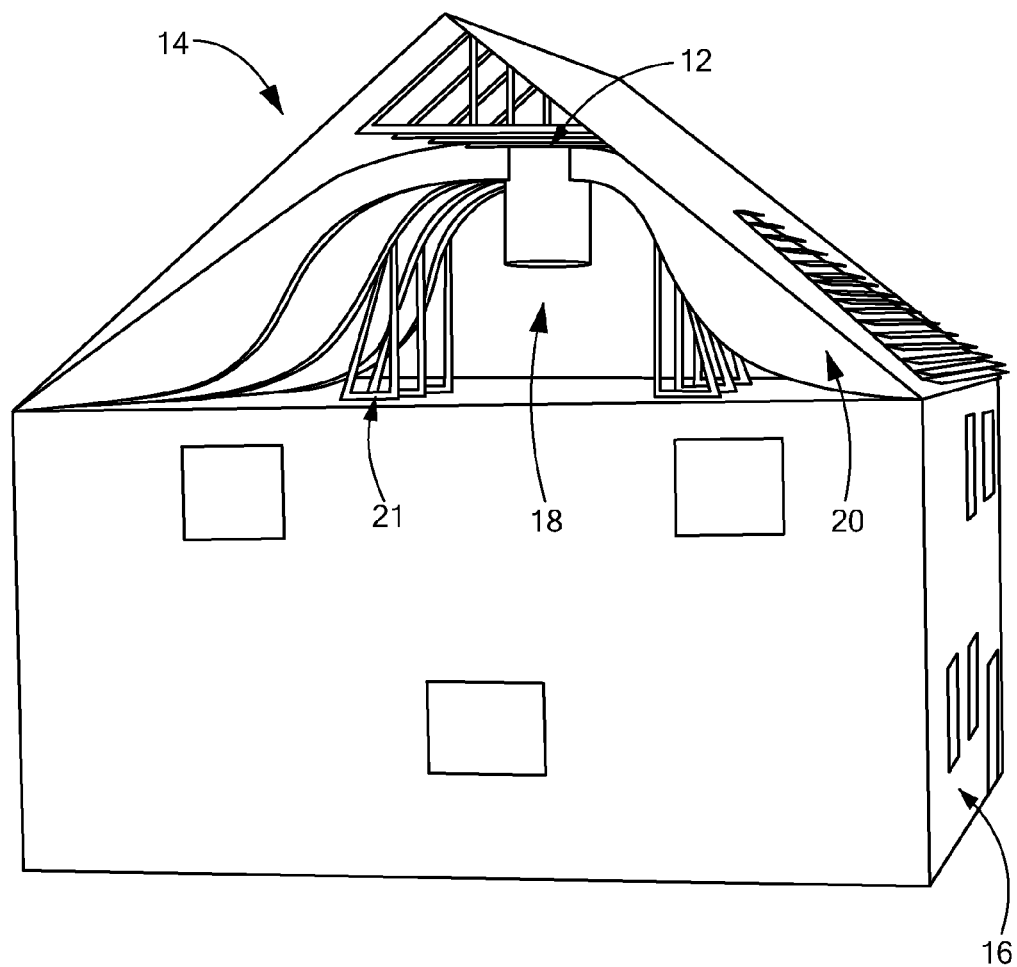
FIG. 4 is a cross-sectional view of the wind harvesting system shown in FIG. 3.

Now referring to the drawings in which like reference designators refer to like elements, there is shown in FIGS. 2-10 embodiments of the wind harvesting system in accordance with the principals of the present invention and designated generally as "10." The wind harvesting system 10 includes a wind turbine 12 disposed subjacent to a roof assembly 14 of a building 16. Alternatively, the system 10 may be positioned above a garage or operate as a stand-alone system, such that energy can be channeled directly or indirectly into an electric car or other appliances or machines needing electricity. The system 10 may be modular, such that it is installable on or in, and removable from, the building 16, or may be prefabricated during construction of the buildings. For example, the roof assembly 14 may be constructed to include the system 10, or the system 10 can be installed within a portion of the entire existing roof assembly 14. The system 10 may be disposed within, above, adjacent to, or about any portion of the building 16 such that a fluid may flow into and exit the system 10.

The wind turbine 12 may protrude above the roof assembly 14 or alternatively be flush with the surface of the roof assembly 14. The wind turbine 12 may be a vertical or horizontal axis turbine, or any similar turbine known the art, and may be in electrical communication with the electrical system of the building, such as a DC generator or AC alternator. Alternatively, the wind turbine 12 may be in electrical communication with a remote power plant by standard power lines. As such, power transportation, and related power losses, from distant power plants may be minimized. It is further contemplated that more than one wind turbines 12 may be included in the system 10 in accordance with the principles of the invention. For example, the wind turbines 12 may be disposed subjacent to the roof assembly 14 in series or in parallel.

The building 16 may be any residential, commercial, or industrial building of any shape, size, or design having a roof assembly 14. The roof assembly 14 may be an enclosure of any shape, size, or design and be comprised of any materials, whether rigid or flexible. For example, the roof assembly 14 may be a substantially hemispherical dome (FIG. 2), gabled roof (FIGS. 3 and 4), hipped roof, and be any shape, for example, pyramidal, trapezoidal, ovoid, rectangular, or other shapes disposed within, about, or on top of the building 16. The roof assembly 14 may further provide or lend structural support to the building 16. For example, the roof assembly 14 may be constructed to withstand hurricane force winds, substantial rainfall, or blizzard conditions. Additionally, the system 10 may be constructed to aesthetically match the design and features of the building 16 or roof assembly 14. These features may allow the system 10 to be masked, blended, or hidden from view, and not detract from the aesthetics of the building 16.

The roof assembly 14 may further define a hollow interior portion 18 in which sound or heat insulating material may be disposed. This insulating material may, for example, mitigate any noise generated from the wind turbine 12 or prevent heat loss from the building 16. Alternatively, the hollow interior portion 18 may house, for example, a backup battery system, AC-unit, and the like. The hollow interior portion 18 may also be usable by the residents of the building for normal residential uses, such as an attic or additional rooms. It is further contemplated that the system 10 can be installed and integrated around existing structures in the roof assembly, such as antennas or chimneys. Further, other structures, such as dormer vents can be installed adjacent to or integrated with the system 10 or the roof assembly 14 to ventilate the interior portion 18.

Figure 9:
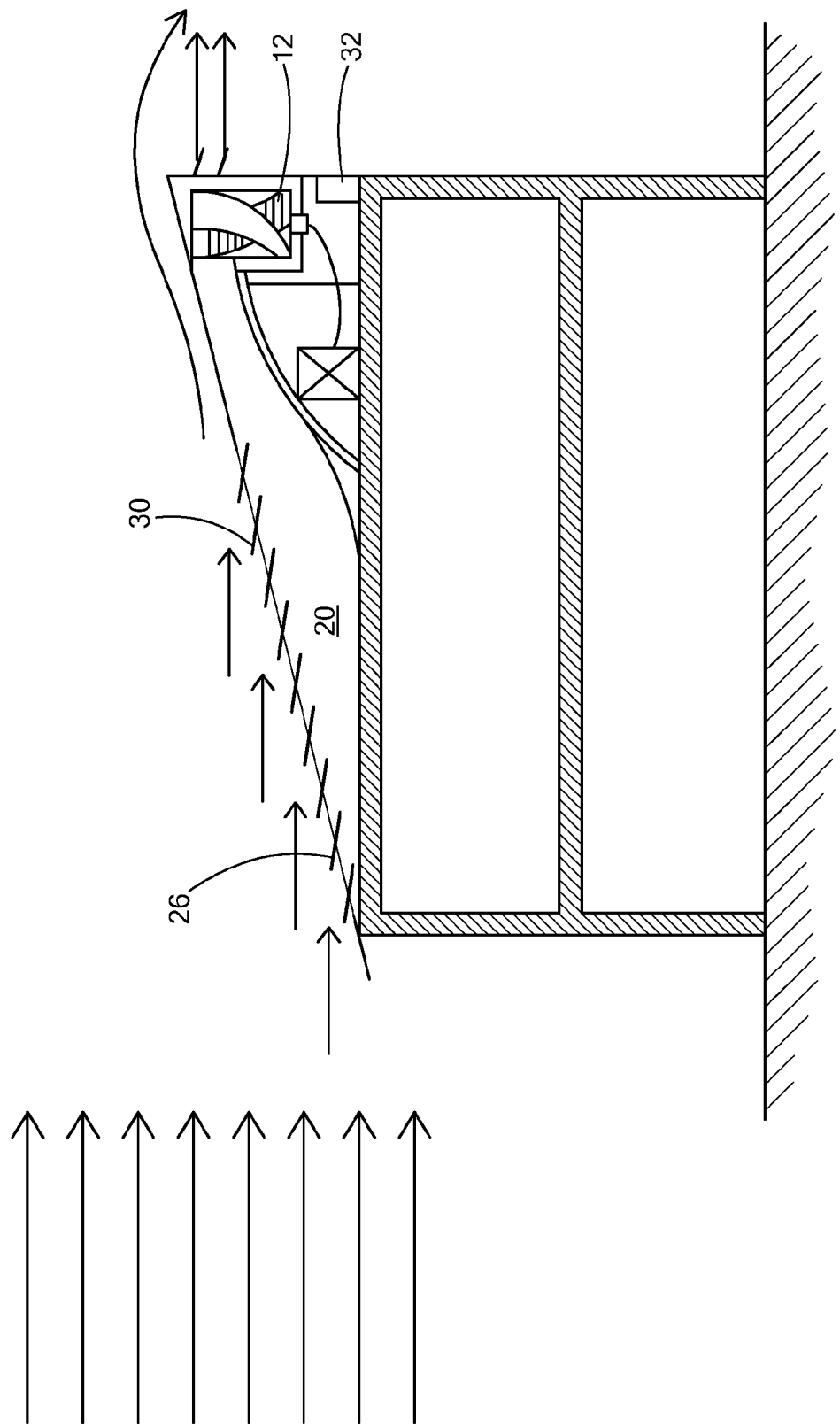
FIG. 9 is an alternative embodiment of the wind harvesting system in accordance with the principals of the present invention.
Figure 10:
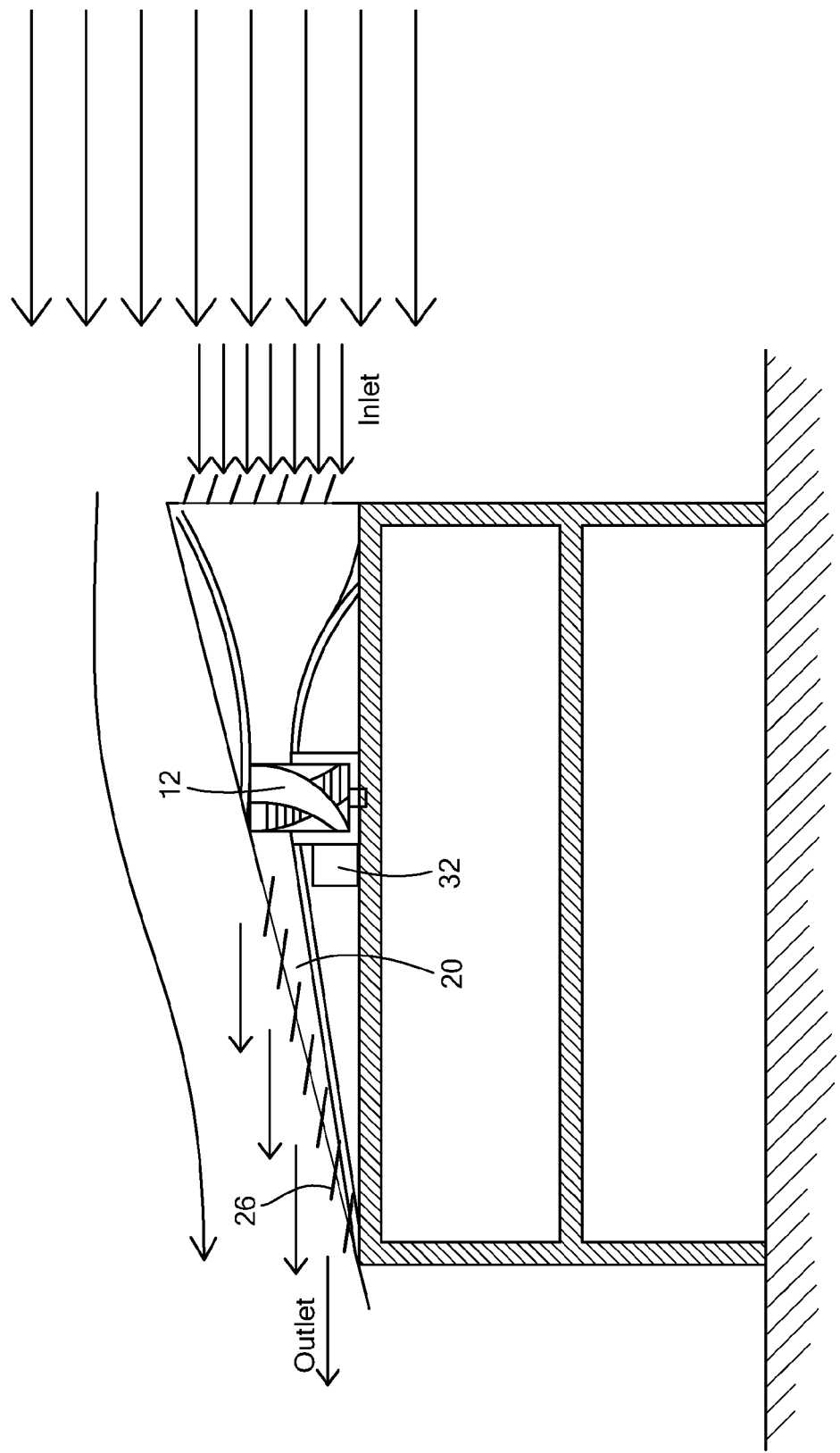
FIG. 10 is an alternative embodiment of the wind harvesting system in accordance with the principals of the present invention.

The system 10 may further define one or more conduits 20 radially disposed about the wind turbine 12. Alternatively, the wind turbine 12 may be adjacent to the conduits 20 as shown in FIG. 9. The orientation and placement of the conduits 20 may facilitate an omni-directional flow of fluid into and out of the system 10. For example, in an embodiment where the conduits 20 are radially disposed about the wind turbine 12, the conduits 20 may be disposed at an incline, for example, 30 degrees, or any angle, and channel and funnel fluid from any direction, to account for changes in fluid flow direction and intensity. Alternatively, the conduits 20 may be disposed randomly or symmetrically about the roof assembly. Each of the conduits 20 may define a first portion 22 and a second portion 24, wherein the first portion 22 has a larger cross-sectional area than the second portion 24. In the embodiment shown in FIG. 10, the wind turbine 12 is disposed between the first portion 22 and the second portion 24 of the conduits 20.

Figure 5:
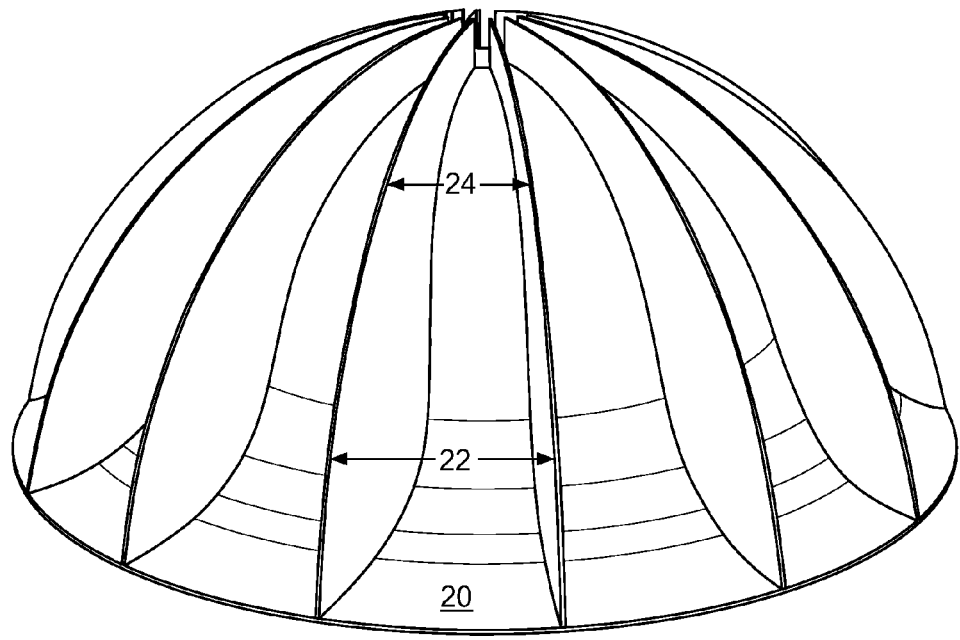
FIG. 5 is a perspective view of the conduits of the wind harvesting system shown in FIG. 2.
Figure 8:
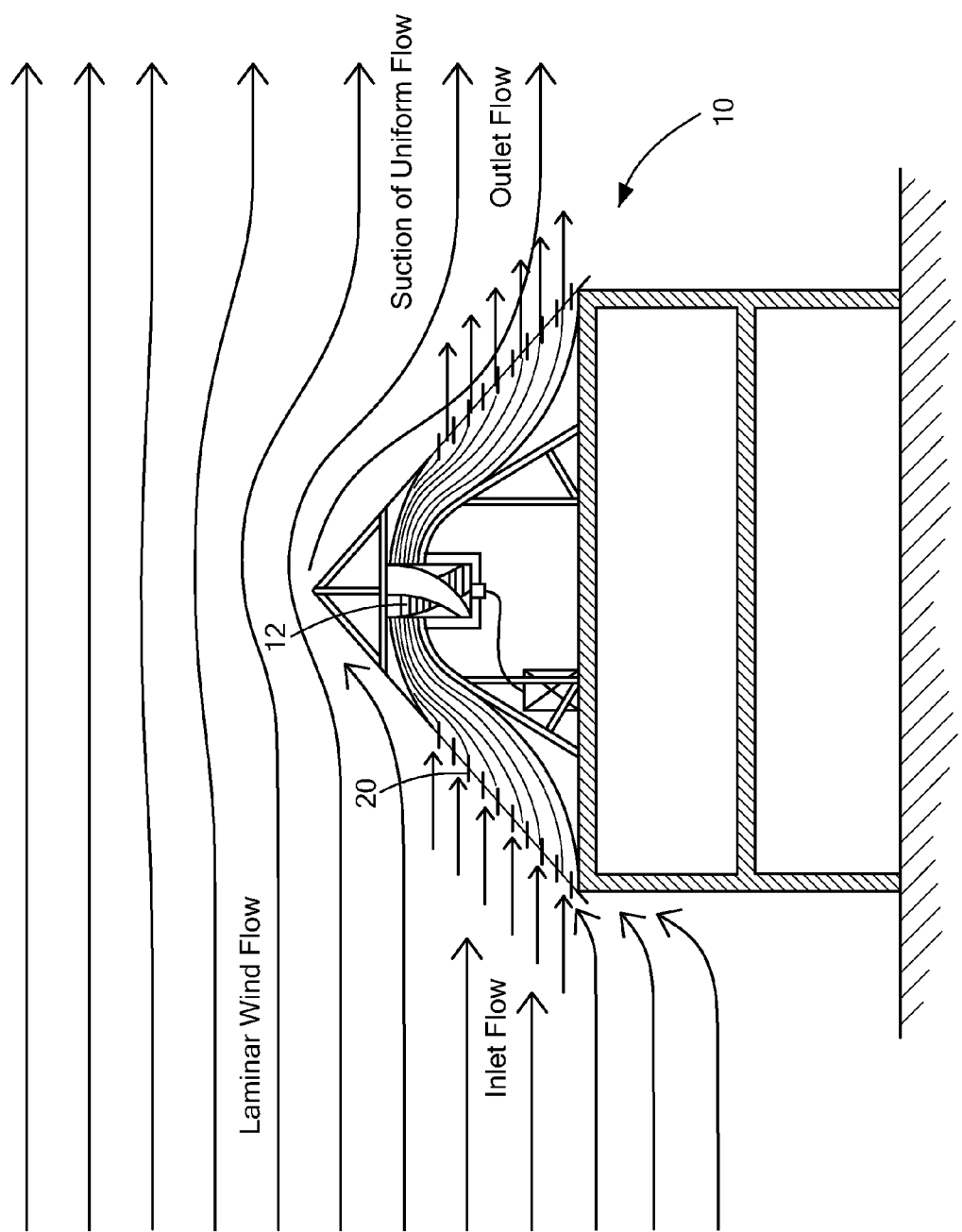
FIG. 8 is a cross-sectional view of the embodiment shown in FIG. 4 showing fluid flow about the system.

Referring to FIG. 5, each of the conduits 20 may include a base, proximal end, distal end opposite the proximal end, first wall, and second wall opposite the first wall. The shape of the base may be geometric, non-geometric or any combination thereof. The base of conduits 20 may have a length and width that may vary depending on the shape of the conduits 20. For example, the base may have a length and at least two widths defined by the first portion 22 and the second portion 24, discussed below. Also, a portion of or the entire base may define a curve along the length of the base. For example, as shown in FIG. 5, at least a portion of the base is substantially S-shaped, substantially sinusoidal, curved, for example, like a bow, circular, or any shape, such that fluid flowing into the conduits 20 may be channeled or funneled toward the wind turbine 12. For example, as shown in FIG. 8, the conduits 20 may define a shallow curvature that facilitates and skews the fluid flow laminarly along the conduits 20. The cross-section of the conduits 20 may also be curved. This curvature and the generally-skewed shape of the conduits 20 may transform a turbulent fluid flow into a laminar fluid flow as the fluid flows towards the wind turbine 12. Alternatively, a circular shape may create a 200% acceleration of a fluid flow. The proximal end of the conduits 20 may be proximate the wind turbine 12 and the distal end of the conduits 20 may be distal the wind turbine 12. The first wall and the second wall may be disposed on the base and along the length of the base from the proximal end of the conduit to distal end of the conduit, as shown in FIG. 5.

Figure 6:
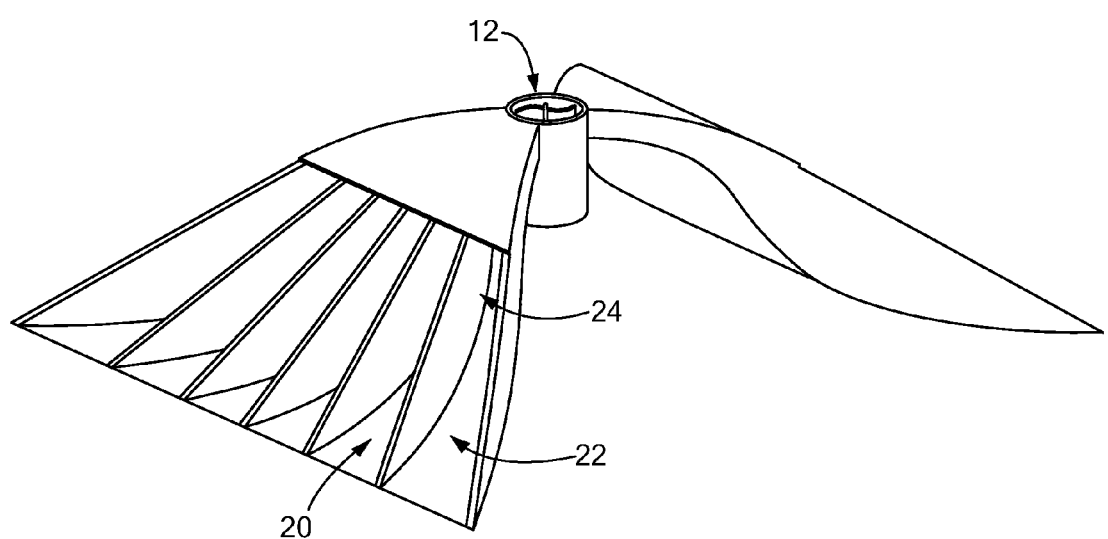
FIG. 6 is another perspective view of the conduits of the wind harvesting system shown in FIG. 3.
Figure 7:
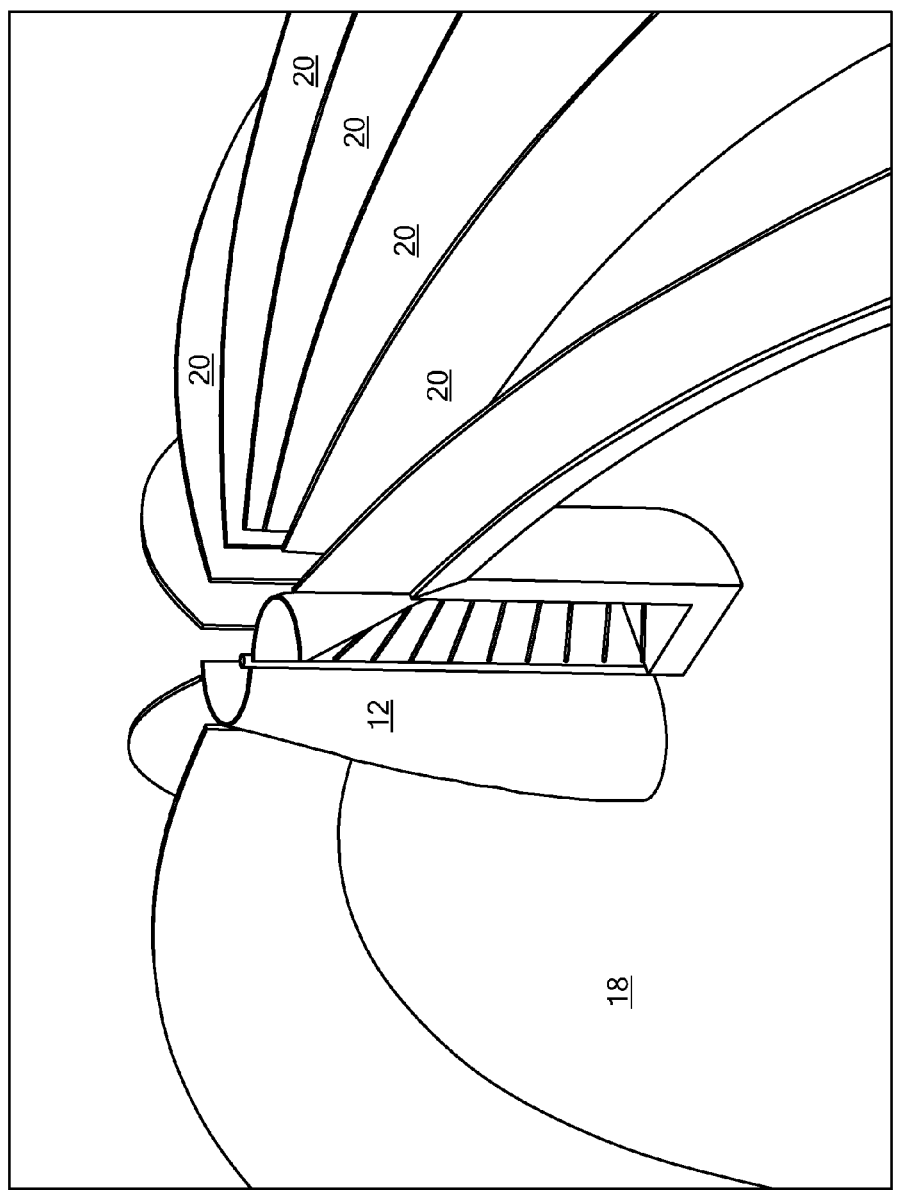
FIG. 7 is a perspective view of the embodiment of FIG. 2 showing the wind turbine disposed between the conduits.

The conduits 20 may be further disposed about the wind turbine 12 such that the second portions 24 are proximate to and surround the wind turbine 12, and the first portions 22 are distal to the wind turbine 12. The cross-sections of the conduits 12 may be any shape or size in accordance with the shape and size of the roof assembly 14. For example, as shown in FIG. 6, a pyramidal roof assembly may include conduits defining a substantially trapezoidal cross-section. The configuration and position of the conduits 20 may operate to increase the velocity of a fluid flow, for example, wind, toward the turbine. The conduits 20 may channel and funnel a laminar or a turbulent fluid flow through each of the conduits 20. The conduits 20 may further be clothed with bendable triplex sheets on a wooden structure to reinforce the shape and may have insulation properties for heat, sound, and vibration. For example, the conduits 20 may be substantially bow-shaped which may reduce vibrations. The conduits 20 may be composed of wood or composite materials such as plastics. Use of composite materials for the conduits 20 may further aid in absorbing and reducing vibrations.

The conduits 20 may also be designed to lend support to the building 16. For example, in an embodiment where the roof assembly 14 is a dome structure, the conduits 20 may lend structural support to the building 16 by reducing compression forces on the building 16. Alternatively, if the roof assembly 14 is gabled or hipped, the conduits 20 may include one or more trusses 21 that reduce the overall loads on the building 16. Additionally, the conduits 20 may have self-cooling and ventilating properties which may facilitate an overall moisture reduction in the roof assembly 14 and provide increasing insulation.

As an inlet fluid flow is channeled and funneled along the conduits 20, the cross-sectional area decreases as the fluid flow traverses the first portion 22 toward the second portion 24, which causes the wind velocity to increase. The increase in velocity of the inlet fluid flow within the conduits 20 is caused, in part, by a Venturi effect. The Venturi effect occurs when the cross-sectional area of the conduits 20 decreases, causing the velocity of the fluid flow to increase by a linear power law as the pressure increases in the conduits 20. The inlet fluid flow velocity proximate the wind turbine 12 may therefore be higher than then initial inlet fluid flow velocity. This increase in velocity may cause the wind turbine 12 to rotate at a higher velocity as the fluid flow is accelerated through the wind turbine 12, which may allow for greater energy extraction.

Figure 11:
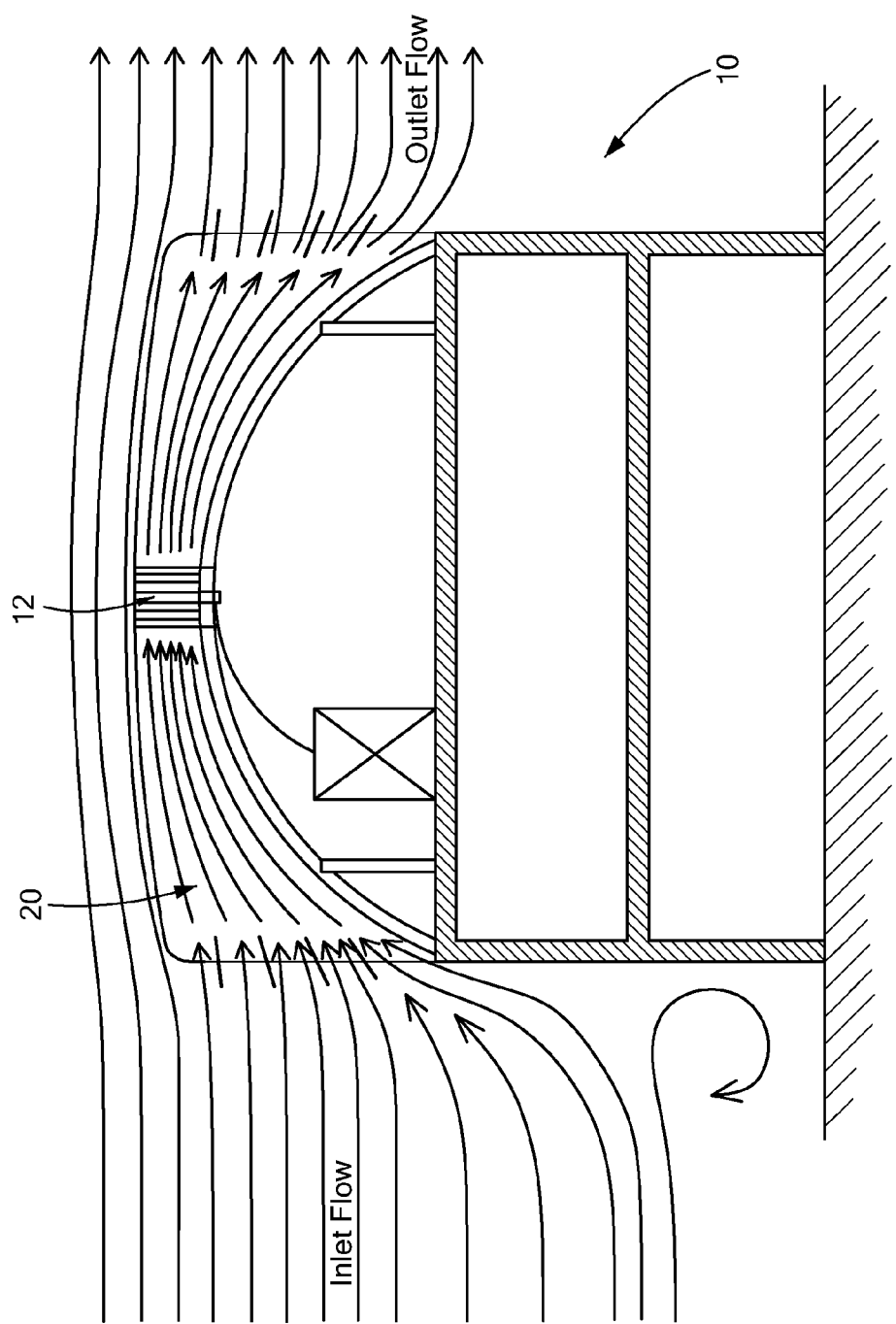
FIG. 11 is an embodiment of the wind harvesting system showing exemplary fluid flow paths through the system.

In an embodiment where the roof assembly 14 is curved, such as a domed structure or a half cylinder roof shape, a portion of the fluid flow that does not enter the conduits 20 may flow over the roof assembly 14. For example, as shown in FIG. 11, a portion of the fluid flow that does not enter the system 10 may flow over the dome in the direction of fluid exhausting from the system 10. The exhaust flow may merge or otherwise combine with the portion of fluid flowing over the dome and create suction or otherwise amplify the exhaust flow exiting the system 10. This suction may in turn cause an increase in velocity of the inlet flow, which may increase the velocity of fluid flowing through the wind turbine 12 and increase the energy output. In the domed embodiment shown in FIG. 11, the velocity of the inlet fluid flow may be the equal or substantially equal to the outlet fluid flow velocity, due in part to the outlet fluid flow being accelerated in addition to the inlet fluid flow. A positive effect of having substantially equal inlet and outlet velocities is that the noise emitted from the system, which typically results from fast flowing wind, is significantly reduced. Furthermore, the system 10 may facilitate the roof assembly 14 to funnel fluid flow from all sides or faces of the roof assembly.

The system 10 may further include controllable apertures 26, such as louvers, panels, or slats moveably coupled to the roof assembly 14. The controllable apertures 26 may be further coupled to the conduits 20 and may operate to direct and channel fluid flow into or away from the wind turbine 12. For example, the controllable apertures 26 may at least partially extend away from the roof assembly 14 to facilitate capture and inlet of fluid flow or to direct the fluid flow towards the conduits 20. The controllable apertures 26 may also be adjusted to be in a closed or blocking position as well as in an exhaust or exiting position. For example, the controllable apertures 26 may be disposed about a lower portion 28 of the roof assembly 14. In an embodiment where the roof assembly 14 is a dome, the controllable apertures 26 span a portion of the dome from approximately 0 to 30 degrees of the height of the dome, or more, where a 90 degree angle is the maximum height of the dome. In alternative embodiments, the controllable apertures 26 may span the entire surface area of the roof assembly 14. These controllable apertures 26 may be made with or include photovoltaic cell panels 30 to supply solar power in zero wind conditions. Alternatively, the controllable apertures 26 may be made of any flexible or rigid material and may be designed to match the color or design of the building 16. For example, the controllable apertures 26 and the roof assembly 14 may be painted white or have white tiles to reduce solar heating.

Adjusting the controllable apertures 26 within a 30 degree angle to an inlet position on the fluid inlet side of the roof assembly 14, and adjusting the controllable apertures 26 on the exhaust side of the roof assembly within a 30 degree angle, may produce increased suction. For example, in this configuration the system 10 may increase the inlet velocity of wind by 526% (4.11 to 21.04 m/s), making an energy profit of 4.208 kWh. This velocity increase assumes the average wind velocity at a location, e.g. South Florida, back pressure in the funnel, friction losses, gravity, duct flow theory and making use of the energy output numbers of a Tangarie GUS 1 Turbine. The system 10 may be calibrated and designed to provide sufficient energy needs for a family based on the average wind velocity of the location, e.g., South Florida, for an embodiment of the system 10 constructed within a single family house. Alternatively, the system 10 may be constructed to power a larger commercial or industrial sized building 16.

A control system 32 may be included in communication with the various components of the system 10, for example, the wind turbine 10 or the controllable apertures 26. The control system 32 may be disposed within or about the building 16 or roof assembly 14, or remotely from the system 10. The control system 32 may also be operated by battery, gas motor, or other power sources. The control system 32 may operate the controllable apertures 26 by rotating, pivoting, or otherwise moving the controllable apertures 26 in response to various environmental conditions. For example, during low wind velocity conditions, the controllable apertures 26 may be adjusted to maximize wind inlet velocity. Alternatively, during high wind velocity conditions, the controllable apertures 26 may be closed or adjusted to slow the inlet of wind into the system 10. The control system 32 may be operated automatically in response to various environmental conditions in accordance with pre-programmed commands and instructions. Alternatively, the control system 32 may be manually operated by a user, for example with a hand-crank, to close the controllable apertures 26 in response to an incoming hurricane. The control system 32 may further include features to maximize desired conditions. For example, the control system may be programmed to adjust noise or heat produced by the system 10.

Figure 12:
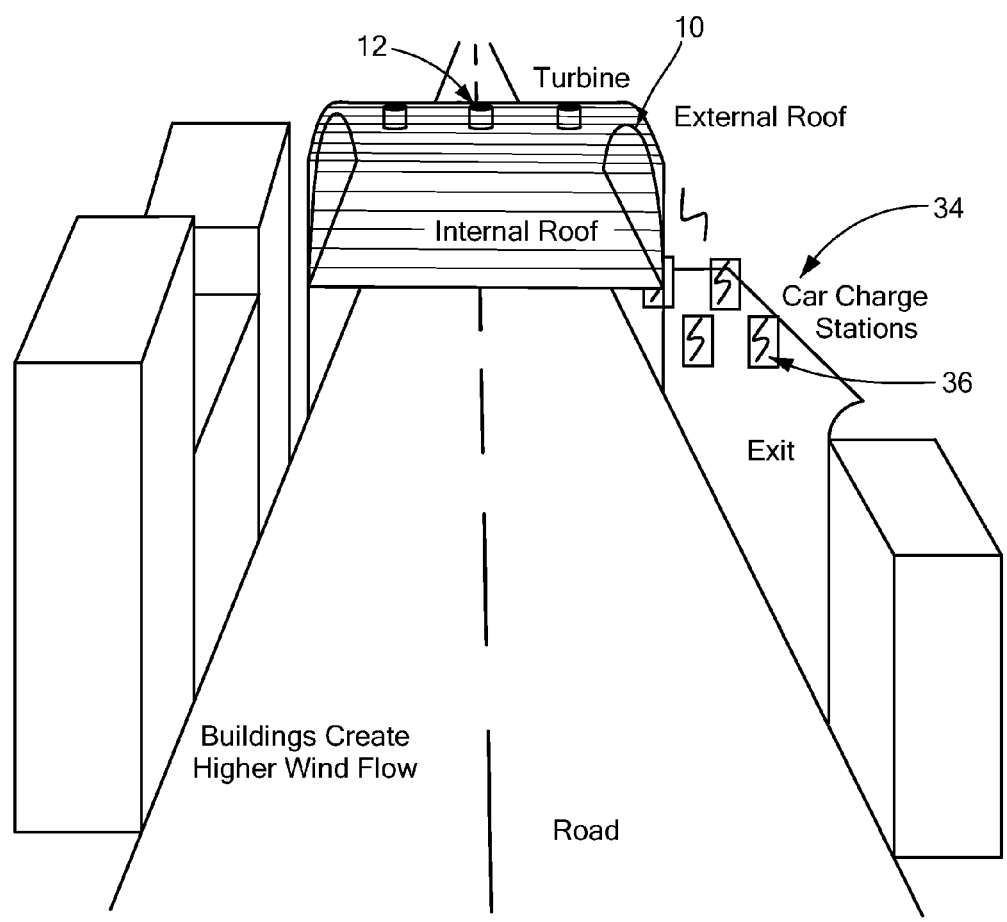
FIG. 12 is an embodiment of the wind harvesting system being deployed along a roadway.

Now referring to FIG. 12, the system 10 may be utilized as an energy harvesting system for homes, but also be utilized to power electric cars, planes, helicopters, or other electrically-powered motorized vehicles. The system 10 may be deployed along roadways, whether highways or local streets, as power stations to re-charge vehicles. For example, as shown in FIG. 12, the system 10 may be deployed above a roadway by spanning adjacent buildings separated by the roadway. An advantage of deploying the system 10 across a roadway having buildings on both sides is that the buildings may operate as a wind tunnel to accelerate the wind toward the system 10. In the embodiment shown in FIG. 12, the system 10 is a domed structure having three vertical wind turbines 12. However, it is contemplated that a plurality of systems 10s, of any shape or size, may be deployed along a roadway, wherein each system 10 may have any number of turbines 12 disposed within or about the system 10.

The system 10 may further be in electrical communication with a power station 34, which may be a rest stop area, shoulder, or other like areas where a vehicle can safely pull to the side of the road to re-charge. Alternatively, the power station 34 can be included in airports, train stations, or other transportation hubs that may be in electrical communication with the system 10. The power station 34 may include a plurality of power ports 36 in electrical communication with the system 10 where a user of a vehicle can directly power the vehicle through a physical connection, for example a plug, or wirelessly. The power station 34 can further be integrated with existing gas stations, rest stops, or other structures, minimizing the cost of implementation. For example, the system 10 and power station 34 can be deployed along existing interstates, for example I-95, such that an electric car and travel from Florida to Maine without exiting the roadway.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the present invention, which is limited only by the following claims.

What is claimed is:

1. A system for harvesting wind energy, comprising:
   a wind turbine having an axis of rotation and disposed subjacent to a roof assembly of building;
   a plurality of conduits disposed adjacent to and extending below the wind turbine, at least a portion of a fluid flow entering the system being channeled through a first conduit, and thence through the wind turbine, and thence through a second conduit substantially opposite the first conduit, wherein the fluid flow from the first conduit to the second conduit is substantially orthogonal to the axis of rotation of the wind turbine;
   each conduit having a base, first wall, second wall opposite the first wall, proximal end and distal end opposite the proximal end, the base having a length defined between the proximal end and the distal end;
   a substantial portion of the base defining a curve along the length of the base; and
   each conduit defining a first portion and a second portion, the first portion defining a larger cross-sectional area than the second portion.

2. The system of claim 1, wherein the second portion of the plurality of conduits is disposed proximate the wind turbine and the first portion of the plurality of conduits is disposed distal the wind turbine.

3. The system of claim 1, wherein the curvature of the conduits operates to convert a turbulent fluid flow into a laminar fluid flow.

4. The system of claim 1, wherein the second portion of each conduit is disposed proximate the wind turbine and the first portion of each conduit is disposed distal the wind turbine.

5. The system of claim 1, wherein the conduits are symmetrically disposed about the wind turbine, the portion of fluid flow entering and exiting the system at least through substantially linearly aligned conduits.

6. The system of claim 1, wherein the wind turbine is in electrical communication with a power supply.

7. The system of claim 1, wherein each conduit defines a substantially S-shaped curvature disposed at an incline.

8. The system of claim 1, wherein the wind turbine is disposed between the first and second portion of each conduit.

9. The system of claim 1, further including a plurality of controllable apertures disposed about the roof assembly, the controllable apertures operable to control fluid flow into each conduit.

10. The system of claim 9, further including a control system in communication with the controllable apertures.

11. The system of claim 10, further including photovoltaic cells coupled to the controllable apertures.

12. A system for harvesting wind energy, comprising:
    a vertical axis wind turbine having an axis of rotation and disposed subjacent to a roof assembly of building;
    a plurality of curved conduits radially disposed about the vertical axis wind turbine, at least a portion of a fluid flow entering the system being channeled through a first conduit, and thence through the wind turbine, and thence through a second conduit substantially opposite the first conduit, wherein the fluid flow from the first conduit to the second conduit is substantially orthogonal to the axis of rotation of the wind turbine; and
    a plurality of controllable apertures disposed about the roof assembly, the controllable apertures operable to control the fluid flow entering the first portion of at least one of the plurality of conduits,
    each of the plurality of conduits defining a first portion and a second portion, the first portion defining a larger cross-sectional area than the second portion, and the second portion being proximate the wind turbine and the first portion being distal the wind turbine.

13. The system of claim 12, wherein the conduits are symmetrically disposed at an incline about the vertical axis wind turbine.

14. The system of claim 12, wherein the roof assembly defines a hollow interior portion.

15. The system of claim 12, wherein each conduit has a base, first wall, second wall opposite the first wall, proximal end and distal end opposite the proximal end, the base having a length defined between the proximal end and the distal end; and
    a substantial portion of the base defining a curve along the length of the base.

16. The system of claim 12, wherein the controllable apertures span a lower portion of the roof assembly.

17. The system of claim 12, wherein the controllable apertures are in communication with a remote control system.

18. The system of claim 17, wherein the remote control system is operable to adjust the controllable apertures in response to environmental conditions.

19. The system of claim 12, wherein the vertical axis wind turbine is in electrical communication with a power supply to the building.

20. A system for harvesting wind energy, comprising:
    a vertical axis wind turbine having an axis of rotation and disposed subjacent to a gabled roof assembly of a building, the vertical axis wind turbine is in electrical communication with a power supply to the building, the roof assembly defining a hollow interior portion and lending structural support to the building;

a plurality of substantially sinusoidal shaped conduits radially disposed at an incline about and extending below the vertical axis wind turbine, at least a portion of fluid flow entering the system being channeled through a first conduit, and thence through the wind turbine, and thence through a second conduit substantially opposite the inlet conduit, wherein the fluid flow from the first conduit to the second conduit is substantially orthogonal to the axis of rotation of the wind turbine, and wherein each of the plurality of substantially sinusoidal shaped conduits defines a first portion and a second portion, the first portion defining a larger cross-sectional area than the second portion, the second portion being proximate the vertical axis wind turbine and the first portion being distal the vertical axis wind turbine;

a plurality of controllable apertures spanning a lower portion of the gabled roof assembly;

a plurality of photovoltaic cells coupled to the controllable apertures; and a control system in communication with the plurality of controllable apertures, the control system operable to adjust the plurality of controllable apertures in response to environmental conditions.

* * * * *